US008820075B2

(12) United States Patent  (10) Patent No.: US 8,820,075 B2
Kaminsky                   (45) Date of Patent:     Sep. 2, 2014

(54) SYSTEM AND METHOD FOR PRODUCING GEOTHERMAL ENERGY

(75) Inventor: Robert D. Kaminsky, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 310 days.

(21) Appl. No.: 13/395,386

(22) PCT Filed: Aug. 27, 2010

(86) PCT No.: PCT/US2010/046992
§ 371 (c)(1),
(2), (4) Date: Mar. 9, 2012

(87) PCT Pub. No.: WO2011/049673
PCT Pub. Date: Apr. 28, 2011

(65) Prior Publication Data
US 2012/0199354 A1   Aug. 9, 2012

Related U.S. Application Data

(60) Provisional application No. 61/254,078, filed on Oct. 22, 2009.

(51) Int. Cl.
F03G 7/00      (2006.01)
F03G 7/04      (2006.01)

(52) U.S. Cl.
CPC .. *F03G 7/04* (2013.01); *Y02E 10/10* (2013.01)
USPC ...................................................... 60/641.2

(58) Field of Classification Search
CPC ............ F03G 7/04; F24J 3/085; E21B 43/34; E21B 43/385; Y02E 10/10; Y02E 10/14
USPC ............................................... 60/641.2–641.5
See application file for complete search history.

(56) References Cited

U.S. PATENT DOCUMENTS 3,786,858 A      1/1974  Potter et al.
3,817,038 A *    6/1974  Paull et al. ................... 60/641.2
4,054,176 A *   10/1977  Van Huisen .................... 165/45
(Continued)

OTHER PUBLICATIONS

Gallant, R.J., et al., "Steaming and Operating Strategies at a Midlife CSS Operation", SPE Paper 25794, 1993.

(Continued)

*Primary Examiner* — Hoang Nguyen
(74) *Attorney, Agent, or Firm* — ExxonMobil Upstream Research Law Department (57) ABSTRACT

Methods and systems are provided for extracting geothermal heat from neighboring or proximate/ones in a fractured rock formation. The extraction of heat may be performed by cycling between injection and production using separate wells for each zone and offsetting the injection-production cycles between neighboring zones, for example, by keeping the injection-production cycle;* for neighboring zones out of phase with each other. The techniques provide for improved heal recover}' from rock volumes while decreasing the size of buffer/ones between neighboring/ones, her example, in exemplary embodiments of the present techniques, proximate zones may be within 1000 meters, or even less, of each other. Accordingly, the zones do not have to be totally isolated from each other. The methods and systems described herein may help to impede cross-flow between the zones while minimizing waste heat (and well separation) from unutilized rock layers left between wells.

4 Claims, 8 Drawing Sheets

(56) References Cited

U.S. PATENT DOCUMENTS

| | | |
|---|---|---|
| 4,074,754 A | 2/1978 | Christian |
| 4,078,610 A * | 3/1978 | Arnold ................... 166/280.1 |
| 4,220,205 A | 9/1980 | Coursen et al. |
| 4,223,729 A | 9/1980 | Foster |
| 4,364,232 A | 12/1982 | Sheinbaum |
| 4,392,530 A | 7/1983 | Odeh |
| 4,458,492 A * | 7/1984 | Ziegenhain ................ 60/641.2 |
| 5,244,041 A | 9/1993 | Renard et al. |
| 5,803,171 A | 9/1998 | McCaffery |
| 2006/0026961 A1 | 2/2006 | Bronicki |
| 2006/0162923 A1 | 7/2006 | Ware |
| 2007/0223999 A1 | 9/2007 | Curlett |
| 2009/0272511 A1 * | 11/2009 | Petty ............................ 165/45 |
| 2010/0044039 A1 * | 2/2010 | Rose et al. .................. 166/270 |

OTHER PUBLICATIONS

Robinson, A., "Alternate Operating Strategies for Hot Dry Rock Geothermal Reservoirs", Geothermal Resources Council Transactions, 15, Oct. 1991, 339-345.

PCTUS2010/046992 International Search Report Dated Oct. 22, 2010.

Duchane, D.V. (1991) "Commercialization of Hot Dry Rock Geothermal Energy Technology," *Geothermal Resources Council Transactions*, Oct. 15, 1991, 325-331.

* cited by examiner

SYSTEM AND METHOD FOR PRODUCING GEOTHERMAL ENERGY

CROSS-REFERENCE TO RELATED APPLICATION

This application is the National Stage of International Application No. PCT/US2010/046992, filed 27 Aug. 2010, which claims benefit of U.S. Provisional Patent Application 61/254,078 filed 22 Oct. 2009 entitled SYSTEM AND METHOD FOR PRODUCING GEOTHERMAL ENERGY, the entirety of which is incorporated by reference herein.

FIELD

Exemplary embodiments of the present techniques relate to a system and method for improved geothermal heat extraction from fractured rock.

BACKGROUND

Current energy sources may have limitations in supply or possible environmental effects that have led to research efforts to identify alternate energy sources. For example, the combustion of hydrocarbons generates carbon dioxide. Other energy sources, such as wind and solar energy, are intermittent.

Another source of energy that can be considered is geothermal. Currently, a number of installations around the world use the energy from natural hot water or steam produced from subsurface formations to run turbines or heat facilities. However, energy from these natural hydrothermal formations can be limited by the geographic and geologic availability of such formations. In contrast, so-called "hot dry rock" formations underlie many regions of the world and contain substantial heat energy. These formations can be problematic to access due to their depth, which may be about two to ten kilometers, or more, below the surface of the Earth.

Heat may be extracted from a hot dry rock formation by injecting a fluid (typically water or brine) into the rock formation using injection wells, flowing the fluid through a network of fractures within the rock formation to absorb heat from the rock, and producing a heated fluid through production wells. Such a process is referred to as "hot dry rock" (HDR) geothermal energy extraction. The geothermally heated fluid that is produced may be used to directly heat industrial processes or may be used in conjunction with a thermodynamic cycle to generate power or electricity. In certain applications, a fracture network within the formation is stimulated to improve fluid transmissibility through the fractures. Stimulation may involve hydraulic fracturing, injection of proppants, pressurization to cause fracture slippage, or chemical treatments to cause solids dissolution and widen fractures. Systems which are stimulated are referred to as "enhanced geothermal systems" or "engineered geothermal systems" (EGS).

Conventional hot dry rock geothermal production often utilizes continuous injection of water into wells with production at distant wells (for example, at a well spacing of 500-1000 m). Ideally, the fracture system within the subterranean rock will permit injected water to distribute fairly uniformly throughout the rock to extract geothermal heat. Many subterranean rocks formations (for example, granite basement rock) have extensive networks of natural fractures, although in certain cases the fractures need to be dilated or opened to allow commercially valuable flow rates and heat extraction performance.

The presence of an extensive fracture network is useful for effective performance of HDR geothermal energy extraction. Thermal diffusion is a slow process and, thus, rock that is more than several meters away from fluid flow through a fracture will not have its heat extracted in a commercially acceptable timeframe. Moreover, any real network of fractures will be composed of fractures of differing widths which will affect the fluid flow. More specifically, fluid flow is prone to channel preferentially through a small subset of the fractures within a rock section, such as the larger fractures. When this occurs, only a small fraction of the heat in the target section is actually removed in a reasonable amount of time. Additionally, the fluids produced from the formation may quickly cool to non-economic levels as the rock adjacent to the primary flow fractures are drained of their heat. Hence, using conventional HDR geothermal energy extraction methods, only a small fraction of hot subterranean rock is likely to have suitable fracture networks to permit economic energy extraction.

U.S. Pat. No. 4,220,205 describes a method of producing self-propping fluid-conductive fractures in rock. The method comprises pressurizing a subsurface formation and causing opposing faces of fractures to shear displace. After the shear displacement, the fractures are held open by the misfit between the opposing faces. The tendency for fracture faces to shear displace arises from shear stress retained from the original formation of the fractures.

Early descriptions of hot dry rock geothermal energy extraction were described in U.S. Pat. Nos. 3,786,858 and 3,817,038. U.S. Pat. No. 3,786,858 describes extracting energy from a dry igneous rock geothermal reservoir by a method that includes drilling a well in hot igneous rock to reach at least 150° C., hydraulically fracturing the rock, and circulating water through the crack system. U.S. Pat. No. 3,817,038 describes a method of heating an aqueous fluid in a dry geothermal reservoir formation penetrated by an injection well and a production well, forcing the fluid into the formation with simultaneous heating, and recovering the heated fluid via the production well.

One way to improve heat extraction from the whole of a targeted rock volume is to utilize cyclic injection and production using separate injection and productions wells into the rock volume. For example, cyclic operation of hot dry rock reservoirs where fluid is alternately injected and then produced, may improve access to portions of a rock section. See Duchane, D. V., "Commercialization of Hot Dry Rock Geothermal Energy Technology", *Geothermal Resources Council Transactions*, 15, Oct. 1991, 325-331.

Other injection schemes may use a single injection well to feed two production wells to produce fluid at moderate rather than low pressures so as to dilate fractures during production. The production may be performed cyclically, for example 12-hours on/12-hours off, while injection remains constant. In this way pressure can be built up in the reservoir and fluids better contact the whole of the rock volume. See Robinson, A., "Alternate Operating Strategies for Hot Dry Rock Geothermal Reservoirs", *Geothermal Resources Council Transactions*, 15, Oct. 1991, 339-345.

U.S. Pat. No. 4,074,754 describes a method for producing geothermal energy from a subterranean high temperature reservoir by injecting low salinity water at ambient surface temperature, allowing the injected water to become heated in the reservoir, and then producing water through a well to be used as a source of energy. The method describes a staged well development plan for geothermal extraction. The staged plan utilizes cyclic injection and production through the same well for geothermal energy extraction. In one embodiment the method involves first, second, and third rows of wells drilled into the reservoir; and conducting injection-production cycles in each well of said first row of wells; shutting in each of the first row of wells; conducting injection-production cycles in each well of the second row of wells; conducting injection-production cycles in each well of the third row of wells; and then conducting injection in each well of the second row of wells while producing from each well of said first row of wells and third row of wells. The patent indicates that injection of cold water reduces the temperature of the reservoir around the injection wells and the invention permits reheating of that reservoir volume by overinjecting in selected wells to displace reservoir heat back to the vicinity of cold wells.

Patent application US2007/0223999 (hereinafter "the '999 application") describes a method of connecting a vertical well to two or more vertically-stacked fractured sections into which water is injected and from which water is produced. The reservoir is cyclically produced by flooding a fractured section with water to a point of dilation of the fractures. However, if the fractured segments were in close proximity, fluid communication between sections would be a problem. However, the '999 application does not address how to minimize separations between target sections to prevent fluid communication between horizontally or vertically neighboring sections. Such fluid communication could degrade performance by permitting pressure leak off from one section to another. In the '999 application, fluid communication between the sections is prevented by placing large vertical separations between the completion points, for example, 5000 ft or more. Separate injection and production wells may be used, but the method described in the '999 application does not permit substantially uniform injection and production into individual wells connected to vertically-stacked sections. This may lead to operational and reliability issues by repeatedly cycling pressure within the wells and surface equipment.

Although prior methods describe cyclic injection-production schemes, issues concerning the uniformity of total production and the minimization of spacing between neighboring sections (to lower detrimental flow between sections) have not been adequately addressed. Thus, improved methods are desirable for producing geothermal energy from neighboring sections.

SUMMARY

An exemplary embodiment of the present techniques provides a method for producing geothermal energy from a fractured subsurface formation. The method includes fluidically coupling at least one injection well to each of at least two zones in a fractured subsurface formation, wherein each of the zones is proximate to another zone and within less than about 1000 meters of the other zone. At least one production well is fluidically coupled to each of the zones. A first volume of a fluid is injected into a first zone through one of the injection wells while a second volume of the fluid is produced from a second zone in the fractured subsurface formation through one of the production wells. The first volume, or at least a portion of the first volume, of the fluid may then be produced from the first zone through one of the production wells while a third volume of fluid is injected into the second zone through one of the injection wells. The injection and the production may be cycled through the zones to impede the flow of fluid between the zones, and to maintain a substantially uniform rate of production of a geothermally heated fluid from the fractured subsurface formation. The injection and production cycles may be offset so the at least two zones simultaneously undergo injection or production for about 10% to about 90% of one or more cycle time periods.

The method may further include injecting the fluid into one of the zones using an injection well while a production well into the one of the zones is closed, and producing the geothermally heated fluid from the production well while the injection well into is closed. A substantially uniform rate of total production of the geothermally heated fluid may be maintained from at least a portion of the fractured subsurface formation.

Two or more zones may be in a state of pressure communication. In an exemplary embodiment, pressure communications between two test zones may be determined by injecting a volume, of fluid into a first test zone, and monitoring a pressure in a second test zone via a downhole or surface pressure sensor, wherein a coincident pressure rise in the second test zone as fluid is injected into the first test zone indicates that the first test zone, is in pressure communication with the second test zone. Pressure communications between two test zones may also be determined by injecting a volume of fluid into a first test zone and monitoring a second test zone for coincident seismic events, wherein the presence of coincident seismic events in the second test zone indicates that the first test zone is in pressure communication with the second test zone.

The zones may include two or more vertically stacked segments, and the method may further include injecting the fluid into one of the vertically stacked segments through an injection well configured to independently inject fluid into at least two of the vertically stacked segments. The fluid may be produced from a separate one of the vertically stacked segments through a production well configured to independently produce fluid from at least two of the vertically stacked segments. The injection well and/or the production well may include two or more independent flow paths connected to the surface. A cycle offset between adjacent vertically-stacked sections may be no larger than one-third of a cycle. Further, the two or more vertically-stacked segments may be chosen such that a ratio of vertical fluid permeability to horizontal fluid permeability in each section is less than about 0.50. In the present context, permeability is taken to indicate an apparent Darcy permeability reflecting a fluid flow caused by a pressure difference across a distance greater than an average spacing of natural fractures in the section and where the apparent permeability is calculated by applying Darcy's Law. The distance may be 1, 10, or even 100 meters. The distance may be selected such that increasing the distance does not substantially change the estimate of the apparent permeability. The injection of fluid may be performed at a pressure below a minimum confining stress at an upper edge of the zone into which injection is occurring.

The zones may include at least three horizontally-neighboring sections, and the method may further include injecting the fluid into the at least three horizontally-neighboring zones. The wells may form a regular grid of rows and columns in which wells within rows utilize synchronized injection-production cycles and wells within columns utilize offset injection-production cycles.

Various methods may be used to harvest energy from the geothermally heated fluid. The method may also include flashing the geothermally heated fluid into a vapor and driving a turbine from the vapor. Other methods to harvest heat energy from the fluid may be used. For example, an exemplary embodiment may include passing the fluid through a heat exchanger to heat a second fluid, flashing the second fluid into a vapor, and driving a turbine from the vapor. The heat energy may be directly harvested by heating a process from the fluid.

Another exemplary embodiment of the present techniques provides a system for extracting geothermal energy from a fractured subsurface formation. The system includes at least one injection well and at least one production well fluidically coupled to each of two or more zones in the fractured subsurface formation, wherein each of the zones is proximate to another zone, such as within less than about 1000 meters of the other zone. An injection system may be configured to inject a fluid into each of the zones through an injection well that is coupled to that zone. A production system may be configured to independently produce a geothermally heated fluid through a production well that is coupled to that zone. A control system may be configured to cycle the infection of the fluid into each zone and the production of the geothermally heated fluid from each zone, wherein for at least part of a cycle a production rate of the geothermally heated fluid is greater than an injection rate of the fluid and wherein the cycle substantially isolates each of the zones. A system may be configured to harvest energy from the geothermally heated fluid. The system may include a pumping system configured to combine a flow of the geothermally heated fluid from each of the zones into a substantially uniform flow. The system may also include a flash unit configured to allow the substantially uniform flow to flash into a vapor and a turbine configured to be driven by the vapor. The system may also include a heat exchanger that may be configured to transfer heat from the substantially uniform flow to an operating fluid, a flash vessel that may be configured to allow the operating fluid to flash into a vapor, and a turbine that may be configured to be driven by the vapor. In other embodiments the system may include a process plant configured to be powered at least in part from the heat energy.

DESCRIPTION OF THE DRAWINGS

The advantages of the present techniques are better understood by referring to the following detailed description and the attached drawings, in which.

DETAILED DESCRIPTION

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Boundaries" refer to locations of changes in the properties of subsurface rocks, which typically occur between geologic formations. This is relevant, for example, to the thickness of formations.

A "compressor" is a machine that increases the pressure of a gas by the application of work (compression). Accordingly, a low pressure gas (for example, 5 psig) may be compressed into a high-pressure gas (for example, 1000 psig) for transmission through a pipeline, injection into a well, or other processes.

"Directional drilling" is the intentional deviation of the wellbore from the path it would naturally take. In other words, directional drilling is the steering of the drill string so that it travels in a desired direction. Directional drilling can be used for steering a production well into a fracture cloud around an injection well in a rock formation, as discussed below.

A "facility" is a representation of a tangible piece of physical equipment through which fluids are either produced from a reservoir or injected into a reservoir. In its broadest sense, the term facility is applied to any equipment that may be present along the flow path between a reservoir and its delivery outlets, which are the locations at which fluids either enter the reservoir (injected fluids) or leave the reservoir (produced fluids).

"Lithostatic pressure" (sometimes referred to as "lithostatic stress") is a pressure in a formation equal to a weight per unit area of an overlying rock mass (the "overburden"). The pressure increase in a formation may be around 1 psi for every foot of depth. Thus, a formation that is 100 feet deep may have a fluid pressure of 100 psig. This concept is also related to hydraulic fracturing, as a formation that is at a particular fluid pressure may not fracture until that pressure is exceeded. For example, a formation at a depth of 3000 ft below the surface may use a pressure of greater than about 3000 psig to fracture.

A "formation" is any finite subsurface region. The formation may contain one or more hot dry rock layers, an overburden, or an underburden. An "overburden" or an "underburden" is geological material above or below the formation of interest. For example, overburden or underburden may include rock, shale, mudstone, or other types of sedimentary, igneous or metamorphic rocks.

A "fracture" is a crack or surface of breakage within rock not related to foliation or cleavage in metamorphic rock along which there has been no movement. A fracture along which there has been displacement is a fault. When walls of a fracture have moved only normal to each other, the fracture is called a joint. Fractures may enhance permeability of rocks greatly by connecting pores together, and for that reason, fractures are induced mechanically in some reservoirs in order to boost fluid flow.

"Geological layers" or "layers" refers to layers of the subsurface (for example, the Earth's subsurface) that are disposed between geologic formation tops. A geological layer may include a hot dry rock formation or may represent subsurface layers over a hot dry rock layer.

A "hot dry rock" layer is a layer of rock that has a substantial temperature differential with the surface, for example, 50° C., 100° C., or even greater. The hot dry rock layer may be a granite basement rock around two to 20 Km, or even greater, below the surface of the Earth. As described herein, the heat in the hot dry rock layer may be harvested for energy production. Despite the name, "hot dry rock" is not necessarily devoid of water. Rather, such layers of rock will not naturally produce significant amounts of water or steam flows to the surface without the aid of pumps or fluid injection.

A "horizontal well bore" is used herein to mean the portion of a well bore in a subterranean zone to be completed which is substantially horizontal or at an angle from horizontal in the range of from about 0° to about 15°.

"Hydraulic fracturing" is used to create or open fractures that extend from the well bore into formations. A fracturing fluid, typically viscous, can be injected into the formation with sufficient hydraulic pressure (for example, at a pressure greater than the lithostatic pressure of the formation) to create and extend fractures, open pre-existing natural fractures, or cause slippage of faults. In the formations discussed herein, natural fractures and faults can be opened by the pressure. A proppant may be used to "prop" or hold open the fractures after the hydraulic pressure has been released. The fractures may be useful for allowing fluid flow, for example, through a geothermal energy source, such as a hot dry rock layer. The fractures tend to be vertical at the depths used for geothermal energy production, due to the increased pressure of the overburden.

"Perforated" means that the member or liner has holes or openings ("perforations") through it. The holes can have any shape, for example, round, rectangular, slotted or the like. The term is not intended to limit the manner in which the holes are made, i.e., it does not require that they be made by perforating, or the arrangement of the holes. A perforated well may be used to inject or collect fluids from a reservoir, such as a fracture cloud in a hot dry rock layer.

As used herein, permeability indicates an apparent Darcy permeability reflecting a fluid flow caused by a pressure difference across a distance greater than an average spacing of natural fractures in the section, wherein the apparent permeability is calculated by applying Darcy's Law.

"Pressure" and "total pressure" are interchangeable and have the usual meaning wherein the pressure in an enclosed volume is the force exerted per unit area by the gas on the walls of the volume. Pressure can be shown as pounds per square inch (psi). "Atmospheric pressure" refers to the local pressure of the air. Local atmospheric pressure is assumed to be 14.7 psia, the standard atmospheric pressure at sea level. "Absolute pressure" (psia) refers to the sum of the atmospheric pressure plus the gage pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning. For a pure component in an enclosed system at a given pressure, the component vapor pressure is essentially equal to the total pressure in the system.

"Pressure communication" is a termed used to indicate that two zones in a hot rock reservoir are coupled. In this case, it may indicate that fluid injected into one zone may flow into the other zones (i.e., fluidically coupled), potentially causing fluid loss from a zone. Pressure communication between zones may be determined in numerous ways. For example, a fluid may be injected into a first zone while the pressure is measured in a second zone or in a wellbore fluidically coupled to the second zone. An increase in pressure in the second zone would indicate that the two zones are in pressure communication. Another technique for determining pressure communication would involve injecting fluid into a first zone, while monitoring seismic activity in a second zone. If seismic activity in the second zone results from fluid injection into the first zone, the zones may be considered to be in pressure communication.

"Produced fluids" and "production fluids" refer to liquids or gases removed from a subsurface formation. As used herein, produced fluids include geothermally heated fluids from a hot dry rock formation. Such produced fluids may include liquids, such as water heated by the formation, or gases, such as steam.

"Steam" refers to water vapor or a combination of liquid water and water vapor. If the steam is superheated, it may contain minimal amounts of liquid water and may be termed dry steam. Steam that is in direct contact with liquid water, such as condensate, is termed saturated steam. It will be understood by those skilled in the art that steam may additionally contain trace elements, gases other than water vapor or other impurities. For example, steam produced from a hot dry rock layer may have some amounts of hydrogen sulfide, carbon dioxide, or other materials extracted from the rock.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

"Thickness" of a layer refers to the distance between the upper and lower boundaries of a cross section of a layer, wherein the distance is measured normal to the average tilt of the cross section.

"Utilities" means (unless otherwise specified) anything consumed in a facility or process unit including any fluid (gas or liquid) used in order to operate the processing equipment of the facility or process unit. Some common examples of utilities can include electrical power, fuel gas, seal gas, instrument and control gas, nitrogen or inert gas, blanket gas, hydraulic fluids, pneumatic systems, water (including non-potable water), diesel or gasoline to run turbines or boilers or any other fluid or energy input used to run the equipment for a given process (for example, mechanical energy used to run a compressor).

"Well" or "wellbore" refers to a hole in the subsurface made by drilling or insertion of a conduit into the subsurface. The terms are interchangeable when referring to an opening in the formation. A well may have a substantially circular cross section, or other cross-sectional shapes (for example, circles, ovals, squares, rectangles, triangles, slits, or other regular or irregular shapes). Wells may be cased, cased and cemented, or open-hole well, and may be any type, including, but not limited to a producing well, an experimental well, an exploratory well, or the like. A well may be vertical, horizontal, or any angle between vertical and horizontal (a deviated well), for example a vertical well may comprise a non-vertical component.

"Wellhead" consists of the pieces of equipment mounted at the opening of a well, for example, to regulate and monitor the production fluids from the underground formation. It also prevents leaking of production fluids out of the well, and prevents blowouts due to high pressures fluids formations. Formations that generate high temperature fluids, such as superheated water or steam, that are under high pressure typically require wellheads that can withstand a great deal of upward pressure from the escaping gases and liquids. These wellheads may often be designed to withstand pressures of up to 20,000 psi (pounds per square inch). The wellhead consists of three components: the casing head, the tubing head, and the 'Christmas tree'. The casing head consists of heavy fittings that provide a seal between the casing and the surface. The casing head also serves to support the casing that is run down the well. This piece of equipment typically contains a gripping mechanism that ensures a tight seal between the head and the casing itself.

Exemplary embodiments of the present techniques provide methods and systems for extracting geothermal heat from proximate zones in a fractured rock formation. The extraction of heat may be performed by cycling between injection and production using separate injection and production wells for each zone and offsetting the injection-production cycles between the proximate zones. For example, the injection-production cycles for the proximate zones may be kept out of phase with each other. The techniques provide for improved heat recovery from rock volumes while decreasing the size of buffer zones used to decrease fluid flow between the proximate zones. For example, in exemplary embodiments of the present techniques, the distance between the proximate zones may be 1000, 100, 10, or even 1 meter. The distance may be chosen so that increasing the distance does not substantially change the estimate of the apparent permeability. The methods and systems described herein may help in decreasing fluid flow between the zones while minimizing waste heat (and well separation) left in unutilized rock layers left between wells. For example, proximate zones may be in pressure communication and cross-fluid flow may be impeded by cycling injection and production between zones. This may be performed, for example, by balancing pressure cycles between nearby zones to maintain a substantially constant pressure in the formation. The cyclic flow through the proximate zones also provides a substantially uniform flow of geothermally heated fluids from the fractured subsurface formation while lowering heat loss to surrounding rock from returning fluids (for example, as may occur if a single well were used for both injection and production).

Figure 1A:
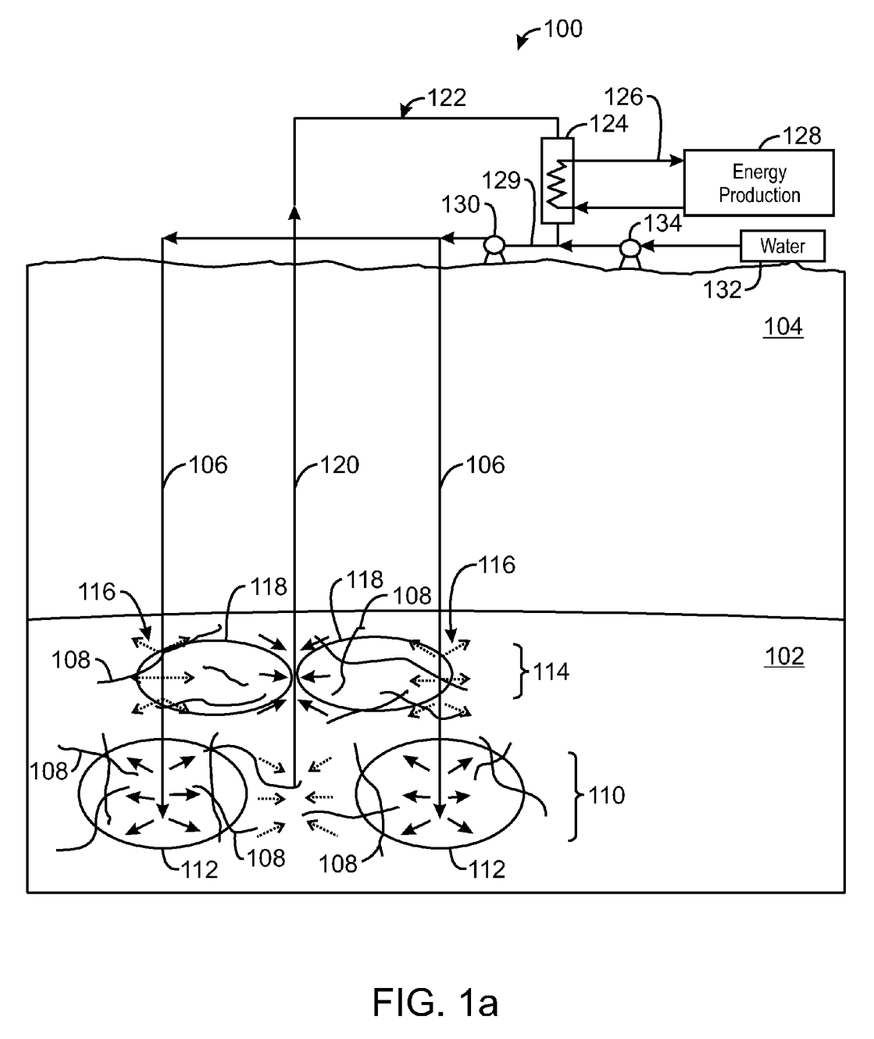
FIG. 1a is a schematic view of a geothermal energy production system, in accordance with an exemplary embodiment of the present techniques.

FIG. 1a is a schematic view of a geothermal energy production system, in accordance with an exemplary embodiment of the present techniques. As shown in FIG. 1a, the energy production system is generally referred to by the reference numeral 100. The energy production system 100 may be used to harvest heat energy from a hot dry rock formation (HDR) 102, such as Precambrian or Hadean Era crystalline rock, including granites, basalts, and the like. The targeted rock zones may often be thick formations (e.g., >300 m). In some embodiments the rock zone may be chosen such that the fluid will be fairly confined vertically. More specifically, the ratio of vertical fluid permeability to horizontal fluid permeability in such formations may be less than unity (e.g., <0.50). Further, the target rock section may include low permeable layers which may prevent fluid and pressure leakage out of the targeted section by flow upwards or downwards.

Various layers of sedimentary, igneous, or metamorphic rock may form an overburden 104 above the HDR 102. Injection wells 106 may be drilled through the overburden 104 and into the HDR 102 for the injection of fluids used to harvest the heat energy contained in the HDR 102. There will often be more than one injection well 106, since it may be problematic to pressurize a sizeable rock section that is not surrounded by injection wells 106. Thus, the system will often have a pattern of injection and production wells that includes two or more injection wells with at least one production well located within a perimeter defined by a set of injection wells.

The fluid injected into the HDR 102 may include water or various other fluids, such as supercritical $CO_2$. The fluids may travel through fractures 108 in the HDR 102. The fractures 108 may be natural, but they can be opened or enhanced by various techniques. Such techniques may include, for example, hydraulically fracturing, with or without the addition of proppants, or by pressurizing the HDR 102 to cause slippage and geometric mismatch of fracture surfaces.

In exemplary embodiments of the present techniques, at least one injection well 106 is fluidically coupled to a first zone 110, allowing fluid to be injected into the first zone 110. The fluid may flow into the fractures 108 and form a reservoir of fluid 112 around each of the injection points. The same injection wells 106 may be used to inject fluids into a second zone 114, located vertically or horizontally near (e.g., within less than about 100 m, 500 m, 1000 m, or farther) the first zone 110, as discussed in detail with respect to FIGS. 3-5. The injection of fluid into the first zone 110 may be performed sequentially with injection into a second zone 114 stopped or slowed during injection into the first zone 110, as indicated by the dotted arrows 116. Further, while fluid is being injected into the first zone 110, a second pocket 118 containing geothermally heated fluid may be removed from the second zone 114 through a production well 120 that is fluidically coupled to the second zone 114. A facility at the surface will contain the equipment needed to operate the injection and production wells 106 and 120. In an exemplary embodiment, the facility will have a control system that includes pumps and valves configured to cycle injection and production among the zones 110 and 114. Alternating the production from the first zone 110 and the second zone 114 may provide a substantially continuous flow of geothermally heated fluid 122 from the HDR 102.

Figure 1B:
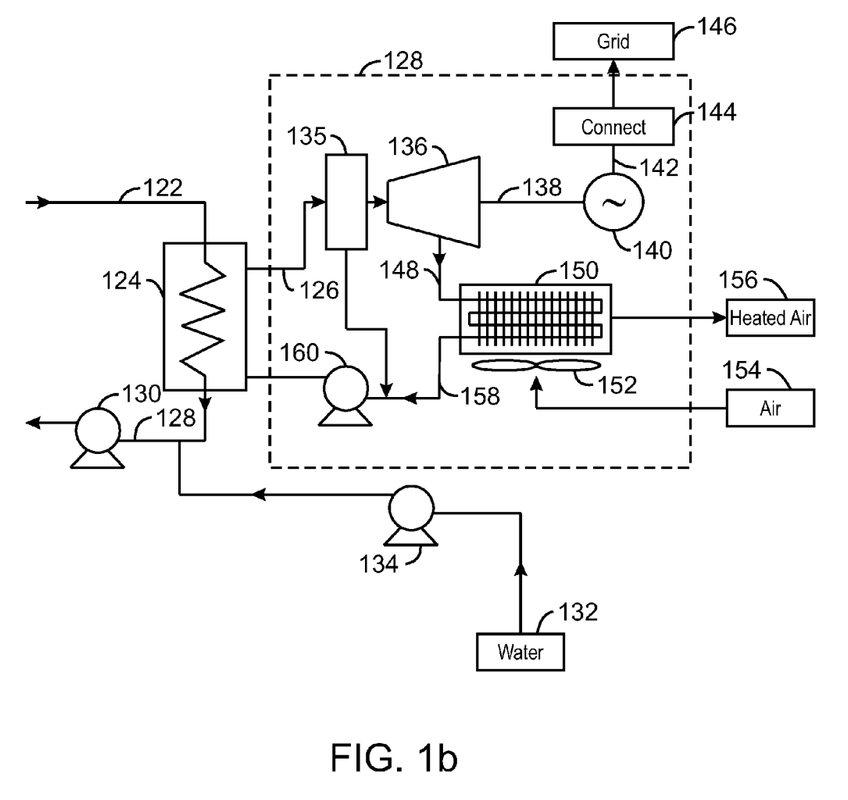
FIG. 1b is a schematic view of an exemplary generation system that may be used with the geothermal energy production system of FIG. 1a, in accordance with an embodiment of the present invention.

In an exemplary embodiment, the geothermally heated fluid 122 is passed through a heat exchanger 124, which may be used to heat a secondary fluid 126 for energy production 128 (for example, using the system discussed with respect to FIG. 1b, among others). The heat exchanger 124 may be a typical tube shell design, or any other design that may be used to transfer heat from the geothermally heated fluid 122 to the secondary fluid 126. After the geothermally heated fluid 122 passes through the heat exchanger 124, the cooled fluid 129 may be passed through an injection pump 130 for injection back into the HDR 102. A fluid makeup, for example water 132, may be added to the cooled fluid 129 through a makeup pump 134 to make up for fluid lost in the zones 112 and 114 or the cooling loop. In another exemplary embodiment, a flash vessel may be used in addition to or in place of the heat exchanger 124. In this exemplary embodiment, the geothermally heated fluid would be flashed into a vapor in the flash unit. The vapor could then be used to drive a turbine for the generation of power.

FIG. 1*b* is a schematic view of an energy production system 128 that may be used with the geothermal energy production system 100 of FIG. 1*a*, in accordance with an embodiment of the present invention. As would be understood, this is merely one example of any number of systems that could be used to generate or transfer energy from a geothermally heated fluid 122. As shown in this exemplary embodiment, the heated secondary fluid 126 may be flashed into a vapor, for example, in a flash vessel, and used to drive a turbine 136. Mechanical power may be transferred from the turbine 136 through a shaft 138 to drive an electrical generator 140. Electrical power 142 from the generator 140 may be fed through an interconnect 144 to an electrical grid 146. The hot, low pressure vapor 148 from the turbine 136 may be passed through a secondary heat exchanger 150 for cooling and condensation. A fan 152 may pass air 154 over the secondary heat exchanger 150, removing heat from the low pressure vapor 148 into a heated air stream 156. After removal of the heat, the condensed fluid 158 may be pressurized, for example, by a pump 160, before being passed back through the heat exchanger 124. The secondary fluid may comprise water, ammonia, propane, butane, pentane, a commercial refrigerant, or other fluid with a phase behavior to allow vaporizing and condensing at the available temperatures.

The energy production system 128 is not limited to the configuration above as other systems may be used to harvest the energy. For example, in other exemplary embodiments, the geothermally heated fluid 122 may be directly flashed into a vapor in a flash unit and used to drive a turbine, for example, for the generation of electricity. Further, the geothermally heated fluid 122 may be used to provide heat to other processes, for example, hydrocarbon production processes. In other embodiments, the heat exchanger 124 may be used to directly heat a gas, such as an airflow used for heating buildings or residences.

The efficiency of the energy production may be improved by having a substantially continuous flow of geothermally heated fluid 122 through the heat exchanger 124. This may be performed by cyclic production of geothermally heated fluid 122 from multiple zones, such as zones 110 and 114. Although such zones may be fluidically isolated from each other by leaving large distances between groups of wells, the presence of fractures through the rock may make this impractical, due to the separation needed to prevent fluid flow between zones. Further, multiple sets of wells used to access multiple zones may significantly increases costs. Accordingly, one exemplary embodiment of the present techniques allows production of geothermally heated fluid from closely approximating zones using one or more injection wells that are configured to allow separate injection into multiple zones, for example, vertically stacked zones. Similarly configured production wells can allow production from each of several zones through single wells. This exemplary embodiment is discussed further with respect to FIGS. 2-4.

Figure 2:
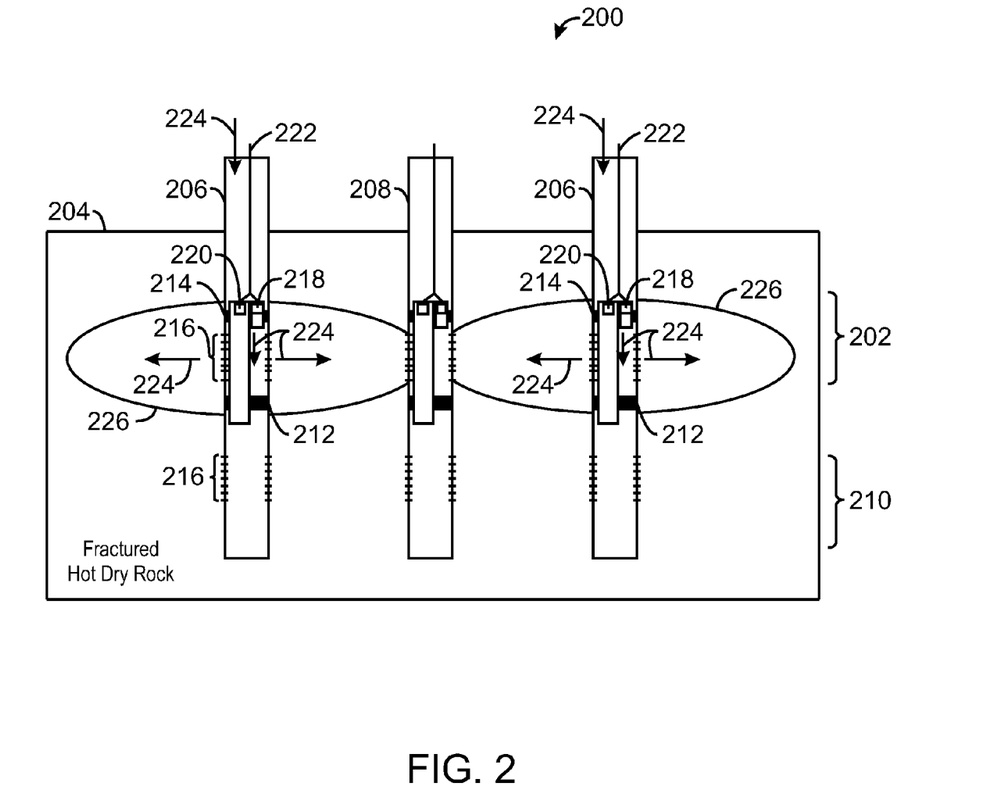
FIG. 2 is a schematic view of an initial injection cycle into an upper zone of a group of vertically stacked zones in an HDR formation, in accordance with an exemplary embodiment of the present techniques.

FIG. 2 is a schematic view of an initial injection cycle into an upper zone of a group of vertically stacked zones in an HDR formation, in accordance with an exemplary embodiment of the present techniques. The initial injection cycle is generally referred to by the reference number 200. During the initial injection cycle 200, fluid is injected into an upper zone 202 of a HDR 204. As shown in FIG. 2, two injection wells 206 and a production well 208 may be used to produce geothermally heated fluids from two production zones, an upper zone 202 and a lower zone 210. However, the number of vertically stacked zones is not limited to two, as the well may be configured to access three or more vertical zones. Further, any number of injection and/or production wells may be used to access the zones.

The injection wells 206 are completed with packers 212 that isolate the upper section of the injection wells 206 from the lower section of the injection wells 206. Further packers 214 may be positioned in the injection wells 206 above the upper zone 202 to lower fluid loss through the injection wells 206. Other packers (not shown) may be used to isolate other sections of the wells, for example, additional zones (not shown) or the bottom of the well. Each section of the injection wells 206 has perforations 216 that can define the location of the upper and lower zones 202 and 210, for example, by allowing fluid to flow into those zones 202 and 210.

Each of the injection wells 206 has a first valve 218 that controls fluid flow into the section of each of the wells 206 that lead to the upper zone 202, for example, to control whether the injection wells 206 are fluidically coupled to the upper zone 202. When the first valve 218 is open, a second valve 220 in each injection well 206 that leads to the lower zone 210 is closed. A hydraulic line 222 into each of the injection wells 206 may be used to select which valve 218 and 220 is opened or closed, allowing injection to alternate between the upper zone 202 and the lower zone 210. Further valves may allow injection into additional zones, for example, above and/or below the zones 202 and 210 illustrated.

As shown in FIG. 2, during the initial cycle of fluid injection into the HDR 204, the first valve 218 in each of the injection wells 206 is open while the second valve 220 is closed. This allows fluid to flow into the upper zone 202, as indicated by the arrows 224. As fluid is injected into the rock, pressure increases and causes dilation of the fractures around each of the injections wells 206. The fluid fills the network, forming pockets 226 and extracting heat from the HDR 204 by thermal conduction. The injection pressure is controlled so that the pressure in the upper zone 202 approaches, but does not exceed, a fracture pressure of the rock, i.e., a minimum confining stress of the HDR 204. This may help control fluid loss by lowering the risk of forming a vertical fracture leading into the lower zone 210 or out of the formation. During this phase of the fluid injection, the production well 208 is closed off.

Figure 3:
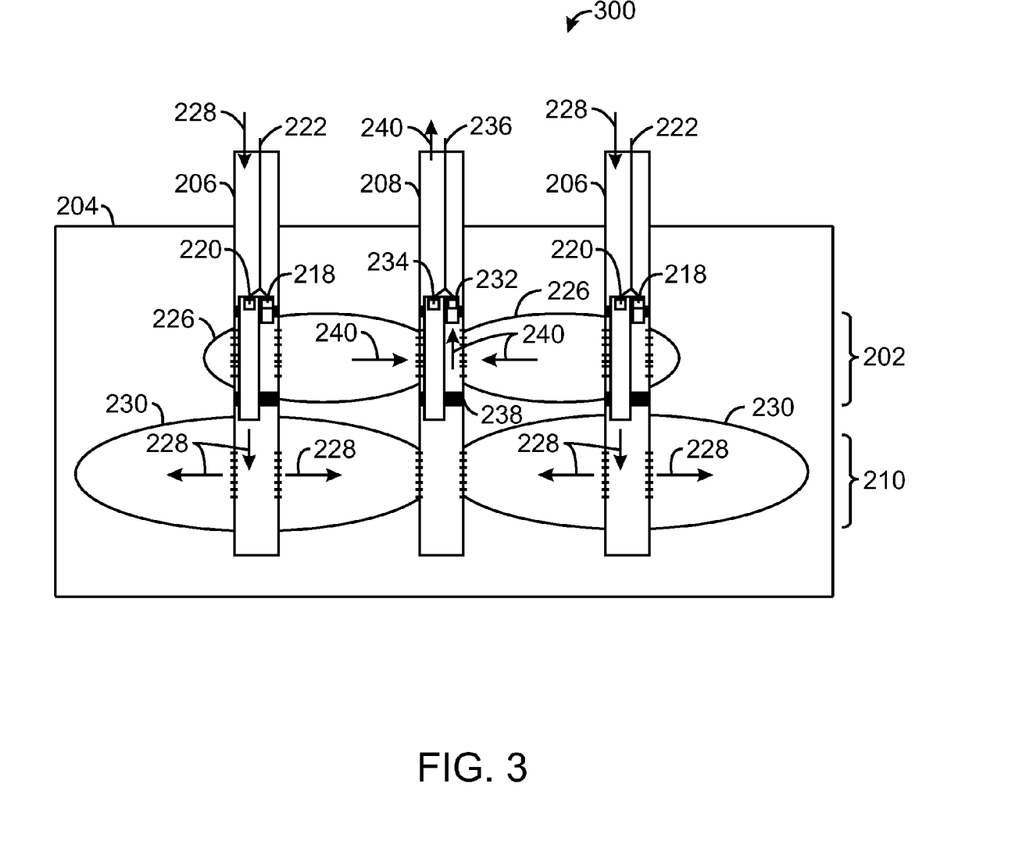
FIG. 3 is a schematic view of a first injection-production cycle into the group of vertically stacked zones in the HDR, in accordance with an exemplary embodiment of the present techniques.

FIG. 3 is a schematic view of a first injection-production (I/P) cycle into the group of vertically stacked zones in the HDR, in accordance with an exemplary embodiment of the present techniques. The first injection-production cycle is generally referred to as first I/P cycle 300. As shown in FIG. 3, during the first I/P cycle 300, the first valve 218 in each injection well 206 is closed while the second valve 220 is opened. This allows fluid to flow into the lower zone 210, as indicated by arrows 228. The fluid flow forms pockets 230 in the lower zone 210. While the pockets 230 are filling, the pockets 226 in the upper zone 202 may be drained through the production well 208.

In this exemplary embodiment, the production well 208 has a first valve 232, which, when opened, allows production of fluid from the upper zone 202. A second valve 234 allows production of fluid from the lower zone 210, when opened. A packer 238 is placed in the production well 208 between the upper zone 202 and lower zone 210 to lower fluid loss between the zones 202 and 210. A hydraulic line 236 into the production well alternately selects which of the two valves 232 and 234 is opened and which is closed. In the exemplary embodiment illustrated in FIG. 3, the first valve 232 is opened to allow fluid to be drained from the pockets 226 in the upper zone 202, as indicated by arrows 240. During the first I/P cycle 300, the second valve 234 in the production well 208 is closed, allowing the pockets 230 in the lower zone 210 to be filled by the injection wells 206.

Figure 4:
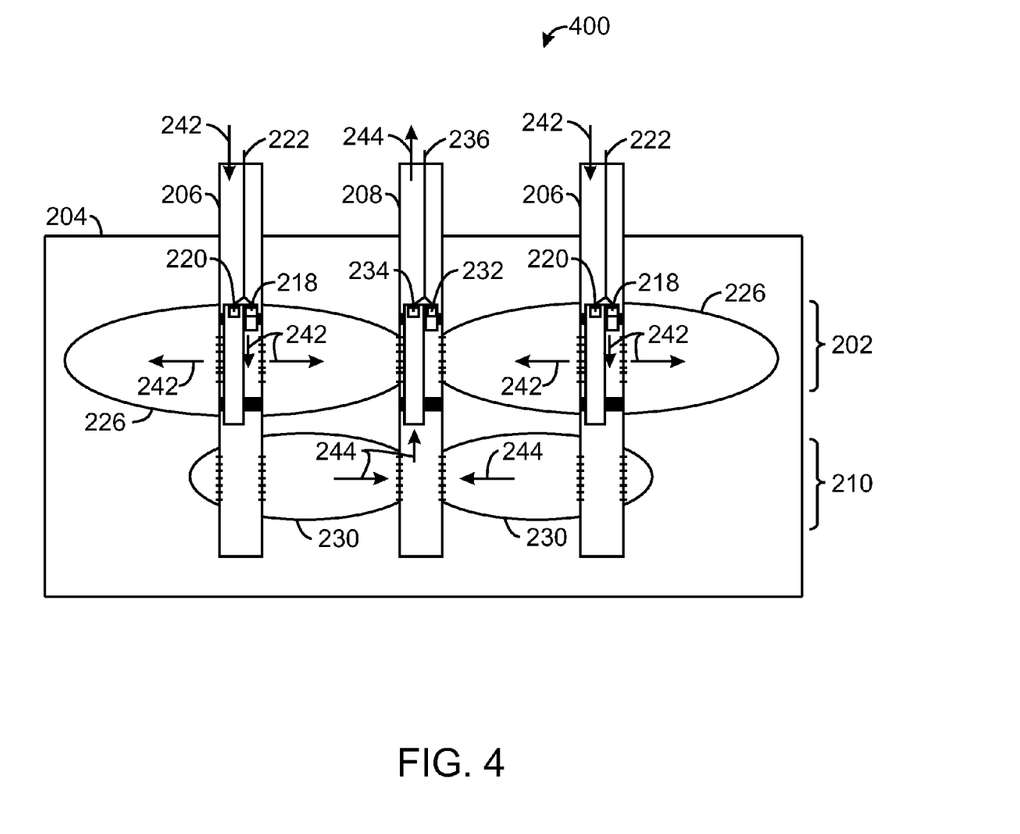
FIG. 4 is a schematic view of a second injection-production cycle into the group of vertically stacked zones in the HDR, in accordance with an exemplary embodiment of the present techniques.

FIG. 4 is a schematic view of a second injection-production cycle into the group of vertically stacked zones in the HDR, in accordance with an exemplary embodiment of the present techniques. The second injection/production cycle is generally referred to as the second I/P cycle 400. Upon entering the second I/P cycle 400, the hydraulic control line 222 into each of the injection wells 206 is used to open the first valve 218 and close the second valve 220, allowing fluid injection into the upper zone 202 as indicated by arrows 242 while blocking fluid injection into the lower zone 210. The flow of fluid into the upper zone 202 reforms the pockets 226 in the upper zone 202.

During the second I/P cycle 400, the first valve 232 in the production well 208 is closed, while the second valve 234 is opened. This configuration allows fluid to be produced from the pockets 230 in the lower zone 210 as indicated by arrows 244. Alternating between the first I/P cycle 300 and the second I/P cycle 400 may allow for the substantially continuous production of geothermally heated fluid from the HDR 204.

Production zones do not have to be vertically arranged to take advantage of the cyclic production techniques discussed herein. In other exemplary embodiments, the zones may be arranged horizontally as discussed with respect to FIGS. 5 and 6. Furthermore, other embodiments may have both vertical and horizontal zones.

Figure 5:
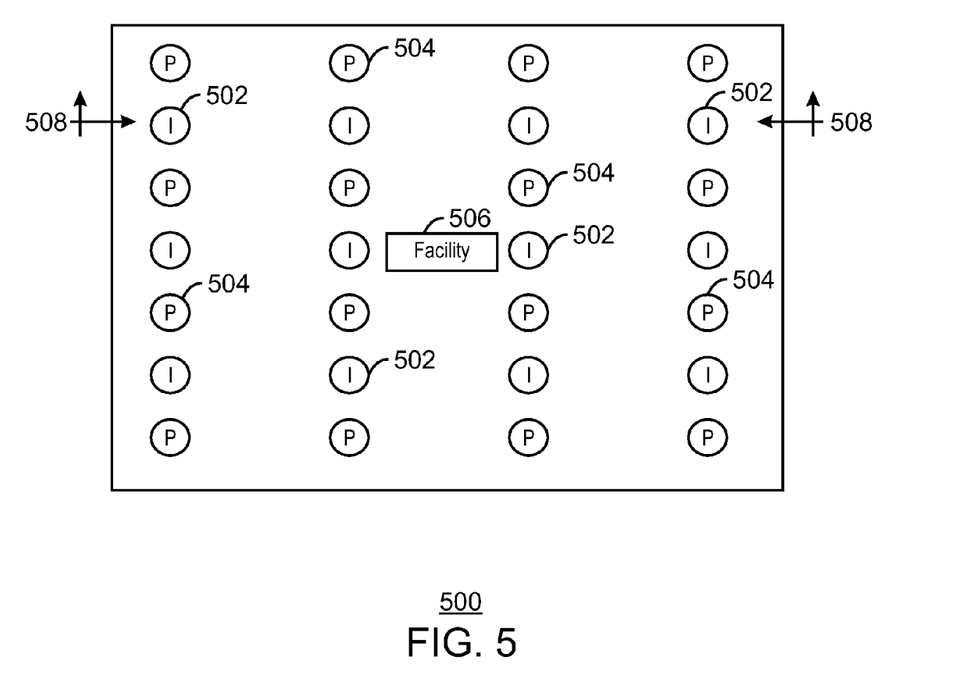
FIG. 5 is a top view of a grid of injection and production wells that are used to produced geothermal energy from zones that are horizontally oriented, in accordance with an exemplary embodiment of the present techniques.

FIG. 5 is a top view of a field of injection and production wells that are used to produce geothermal energy from zones that are horizontally oriented, in accordance with an exemplary embodiment of the present techniques. The field is generally referred to by the reference number 500. In the embodiment shown, the field 500 has a regular grid of injection wells 502 (labeled as 'I') for injecting a fluid into a HDR formation. A regular grid of production wells 504 (labeled as "P") may be used to produce geothermally heated fluids from the HDR formation. A facility 506 may contain the control system, pumps, heat exchangers, flash vessels, and other equipment that may be used in producing the geothermal energy, as discussed with respect to FIGS. 1a and 1b. Each of the injection wells 502 and production wells 504 may be separately connected to the facility 506, allowing for individual injection and production from the wells 502 and 504.

In this exemplary embodiment, geothermal energy may be extracted from a subsurface network of fractures by cyclic injection and production of water into a set of horizontally-neighboring or horizontally-approximating zones where offset injection-production cycles are used to provided a fairly uniform total production rate. Specifically, cycle offsets between the proximate zones may be less than one-third of a cycle, and at least one injection well 502 and at least one production well 504 may be coupled to each zone. For example, if a complete injection-production cycle takes 30 days then a cycle offset of one-third would mean that if a cycle in a first zone started at day 0 and ends at day 30, then a cycle in a second zone could starts at day 10 and ends at day 40. The injection and production cycles may be further explained by examining a production cycle along a cross section view of the field 500, as indicated by line 508. In other embodiments, the injection-production cycles may be offset by 10%, 25%, 50%, 75%, 90%, or even 100% (for example, where injection into a zone is only performed during production from another zone).

Figure 6:
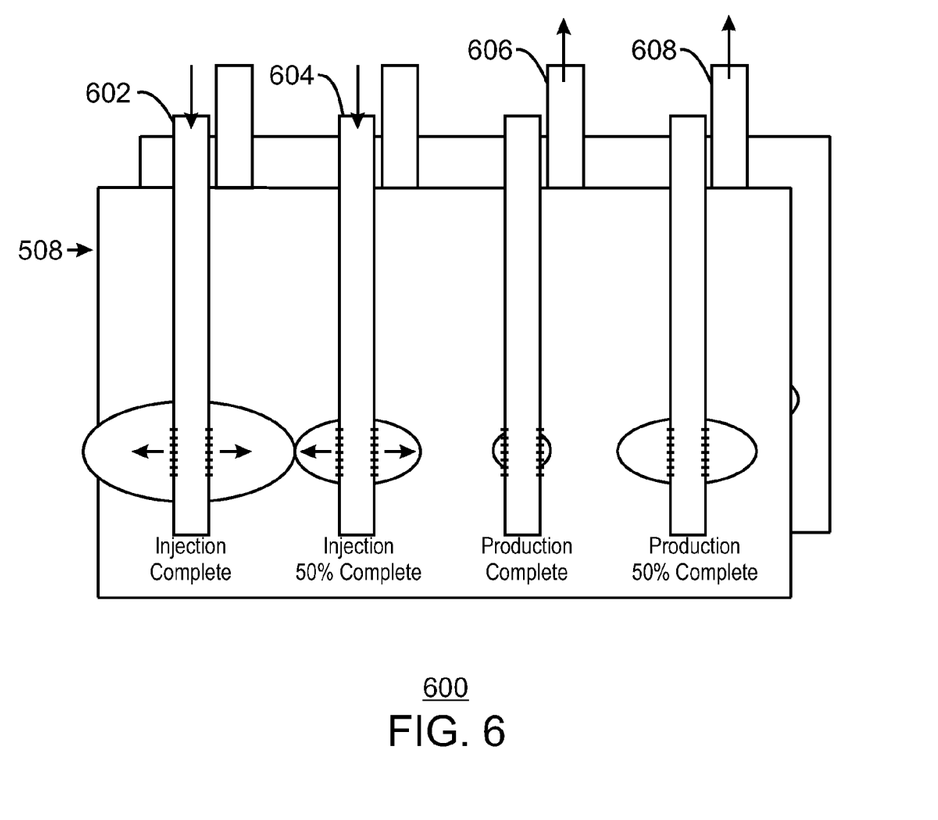
FIG. 6 is a cross-sectional view of the field shown in FIG. 5, schematically illustrating an injection/production cycle in horizontally oriented zones, in accordance with an exemplary embodiment of the present techniques.

FIG. 6 is a cross-sectional view of the field shown in FIG. 5, schematically illustrating an injection/production cycle in horizontally oriented zones, in accordance with an exemplary embodiment of the present techniques. This cross-sectional view is taken along line 508 in FIG. 5. The injection/production cycle is generally referred to as I/P cycle 600. As can be seen in the exemplary embodiment shown in FIG. 6, during the I/P cycle 600, different zones are each in different stages of injection or production. The offset in the cycles between the proximate zones, may lower any pressure differential that exists between the proximate zones and, thus, lower the tendency for cross-flow may be substantially reduced. For example, as shown in FIG. 6 the cycles are offset by ¼ of cycle between each pair of injection and production wells. Accordingly, injection through a first injection well 602 is complete when injection through an adjoining second injection well 604 is 50% complete. Similarly, production from an adjoining first production well 606 is complete when production from an adjoining second production well 608 is 50% complete.

Figure 7:
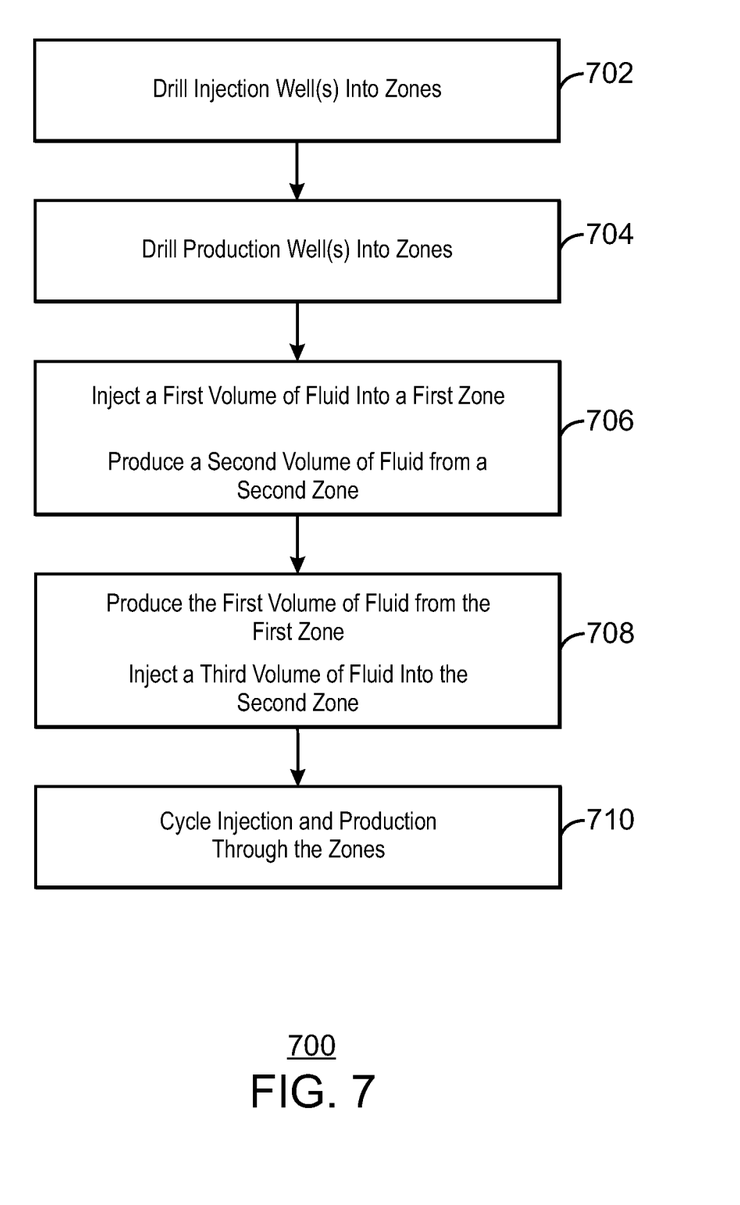
FIG. 7 is method for harvesting geothermal energy from rock formations using separate injection and production wells to cycle through a number of zones in a rock formation, in accordance with an exemplary embodiment of the present techniques.

FIG. 7 is process flow diagram of a method for harvesting geothermal energy from rock formations using separate injection and production wells to cycle through a number of zones in a rock formation, in accordance with an exemplary embodiment of the present techniques. The method is generally referred to by reference number 700. The method 700 begins at block 702 with the drilling of one or more injection wells into an HDR formation. The HDR formation may be located at depths of 1 to 20 Km, or even farther, below the surface of the Earth. Thus, advanced drilling techniques, such as particle jet drilling (PJD) may be useful. At block 704, one or more production wells may be drilled into the vicinity of the injection wells. To assist in directing the production wells into the vicinity of the injection wells, a number of micro-seismic detection wells may be drilled over the field. The micro-seismic detection wells may be used to track the sounds that result from hydraulic fracturing through the injection wells.

Once the injection and production wells are in place, the production cycles may be performed. At block 706, a first volume of fluid may be injected into a first zone, while a second volume of fluid is produced from a second zone. The cycle may continue at block 708 with the production of at least a portion of the first volume of fluid from the first zone, while a third volume of fluid is being injected into the second zone. These cycles may extend across numerous zones, wherein the zones are vertically and or horizontally located with respect to each other. For example, a thick formation may have multiple adjacent injection and production wells in a grid over the field, as discussed with respect to FIGS. 5 and 6, wherein some or all of the wells have multiple vertical zones, as discussed with respect to FIGS. 2-4. The cycling through the zones may be useful for stabilizing the pressure in the formation, allowing close placement of wells with minimal cross-flow between zones. The cycles are repeated at block 710, providing a substantial stable flow of geothermally heated fluid.

While the present techniques may be susceptible to various modifications and alternative forms, the exemplary embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A method for producing geothermal energy from a fractured subsurface formation, comprising:
   a) fluidically coupling an injection well to each of two zones in the fractured subsurface formation, wherein each of the two zones are vertically stacked in the fractured subsurface formation, wherein the fluidic coupling to each of the two zones is configured to be independently controlled and wherein the two zones comprise a first zone and a second zone;
   b) fluidically coupling a production well to each of the two zones, wherein the fluidic coupling to each of the two zones is configured to be independently controlled;
   c) injecting through the injection well a first volume of fluid into the first zone while not injecting fluid into the second zone and simultaneously producing through the production well a second volume of fluid from the second zone while not producing fluid from the first zone, and then;
   d) injecting through the injection well a third volume of fluid into the second zone while not injecting fluid into the first zone and simultaneously producing through the production well a fourth volume of fluid from the first zone while not producing fluid from the second zone;
   e) cyclically performing steps c) and d),
   wherein the second volume of fluid and the fourth volume of fluid each comprise a geothermally heated fluid.

2. The method of claim 1, further comprising maintaining a substantially uniform rate of total production of the geothermally heated fluid from at least a portion of the fractured subsurface formation.

3. The method of claim 1, further comprising:
   flashing the geothermally heated fluid into a vapor; and
   driving a turbine from the vapor.

4. The method of claim 1, further comprising:
   passing the geothermally heated fluid through a heat exchanger to heat a flashing fluid;
   flashing the flashing fluid into a vapor; and
   driving a turbine from the vapor.

* * * * *